US007519123B1

(12) United States Patent
Larsson et al.

(10) Patent No.: US 7,519,123 B1
(45) Date of Patent: Apr. 14, 2009

(54) SPECTRAL SHAPING FOR MULTIBAND OFDM TRANSMITTERS WITH TIME SPREADING

(75) Inventors: Torbjorn A. Larsson, San Diego, CA (US); Nishant Kumar, San Diego, CA (US)

(73) Assignee: Staccato Communications, Inc., San Diego, CA (US)

( * ) Notice: Subject to any disclaimer, the term of this patent is extended or adjusted under 35 U.S.C. 154(b) by 483 days.

(21) Appl. No.: 11/099,224

(22) Filed: Apr. 4, 2005

Related U.S. Application Data

(60) Provisional application No. 60/560,948, filed on Apr. 8, 2004.

(51) Int. Cl.
*H04K 1/10* (2006.01)

(52) U.S. Cl. ...................... 375/260; 370/209; 370/287; 370/337; 370/342; 370/333; 370/257; 370/345; 370/543; 455/450

(58) Field of Classification Search .................. 375/260
See application file for complete search history.

(56) References Cited

U.S. PATENT DOCUMENTS 4,015,088 A 3/1977 Dubnowski et al.
4,959,865 A 9/1990 Stettiner et al.
5,029,184 A 7/1991 Andren et al.
5,271,038 A 12/1993 Cai
5,548,582 A 8/1996 Brajal et al.
5,852,630 A 12/1998 Langber et al.
5,974,082 A * 10/1999 Ishikawa et al. ............ 375/141
6,125,103 A 9/2000 Bauml et al.
6,175,551 B1 1/2001 Awater et al.
6,563,881 B1 5/2003 Sakoda et al.
6,574,283 B1 * 6/2003 Sakoda et al. ............... 375/262
6,584,106 B1 6/2003 Merchant et al.
6,587,526 B1 7/2003 Li et al.
6,657,949 B1 12/2003 Jones et al.
6,687,307 B1 2/2004 Anikhindi et al.
6,728,294 B1 4/2004 Kohno et al.
6,807,145 B1 10/2004 Weerackody et al.
6,912,262 B1 6/2005 Chini et al.
7,170,884 B1 1/2007 Radimirsch et al.
7,177,297 B2 2/2007 Agrawal et al.
7,184,719 B2 * 2/2007 Roberts ...................... 455/103

(Continued)

OTHER PUBLICATIONS

Batra et al.,Multi-band OFDM Physical Layer Proposal for IEEE 802.15 Task Group 3a, IEEE P802.15 Wireless Personal Area Networks, Sep. 15, 2003.

(Continued)

*Primary Examiner*—Shuwang Liu
*Assistant Examiner*—Dhaval Patel
(74) *Attorney, Agent, or Firm*—Van Pelt, Yi & James LLP

(57) ABSTRACT

A method of shaping an orthogonal frequency division multiplexing (OFDM) signal spectrum of a transmitted signal is disclosed. An input signal including an input component is received and a first instance of the input component is generated. The method also includes determining that a second instance of the input component is to be different than the first instance. The second instance of the input component that is different from the first instance is generated. An output signal to be transmitted is generated and includes the first instance and the second instance of the input component.

17 Claims, 16 Drawing Sheets

U.S. PATENT DOCUMENTS

| | | | | |
|---|---|---|---|---|
| 7,206,317 | B2 | 4/2007 | Cimini et al. | |
| 7,269,200 | B2 | 9/2007 | Igarashi | |
| 2002/0027875 | A1 | 3/2002 | Sudo et al. | |
| 2003/0142754 | A1 | 7/2003 | Jung et al. | |
| 2003/0189917 | A1 | 10/2003 | Sudo | |
| 2003/0202460 | A1 | 10/2003 | Jung et al. | |
| 2004/0252781 | A1 | 12/2004 | Park | |
| 2005/0078598 | A1* | 4/2005 | Batra et al. | 370/206 |
| 2005/0105594 | A1 | 5/2005 | Giannakis et al. | |
| 2007/0098109 | A1 | 5/2007 | Vadde et al. | |
| 2007/0217546 | A1* | 9/2007 | Sandell et al. | 375/299 |

OTHER PUBLICATIONS

Batra et al., IEEE P802.15 Wireless Personal Area Networks, Project : IEEE P802.15 Working Group for Wireless Personal Area Networks (WPANs), Title: Multi-band OFDM Physical Layer Proposal for IEEE 802.15 Task Group 3a, Apr. 2005, submitted Sep. 15, 2003.

Anuj Batra, Project: IEEE P802.15 Working Group for Wireless Personal Area Networks (WPANS), Submission Title: Multi-band OFDM Physical Layer Proposal, Jul. 14, 2003.

Batra et al., IEEE P802.15, Wireless Personal Area Networks, Project: P802.15 Working Group for Wireless Personal Area Networks (WPANs), Title: TI Physical Layer Proposal for IEEE 802.15 Task Group 3a, Apr. 2005, Date Submitted May 12, 2003.

* cited by examiner 602
600
604
f

SPECTRAL SHAPING FOR MULTIBAND OFDM TRANSMITTERS WITH TIME SPREADING

CROSS REFERENCE TO OTHER APPLICATIONS

This application claims priority to U.S. Provisional Patent Application No. 60/560,948 entitled SPECTRAL SHAPING FOR MULTIBAND OFDM TRANSMITTERS WITH TIME SPREADING filed Apr. 8, 2004 which is incorporated herein by reference for all purposes.

Co-pending U.S. patent application Ser. No. 10/960,431 entitled SPECTRAL SHAPING IN MULTIBAND OFDM TRANSMITTER filed Oct. 6, 2004 is incorporated herein by reference for all purposes; co-pending U.S. patent application Ser. No. 10/960,430 entitled SPECTRAL SHAPING IN MULTIBAND OFDM TRANSMITTER WITH CLIPPING filed Oct. 6, 2004 is incorporated herein by reference for all purposes; and co-pending U.S. patent application Ser. No. 10/960,432 entitled SPECTRAL SHAPING IN MULTIBAND OFDM TRANSMITTER WITH PHASE SHIFT filed Oct. 6, 2004 is incorporated herein by reference for all purposes.

BACKGROUND OF THE INVENTION

Multiband orthogonal frequency division multiplexing (MB-OFDM) is a modulation technique used in some wireless communication systems such as ultra-wideband (UWB). The MB-OFDM modulation technique combines OFDM modulation with frequency hopping. It is a modulation technique suitable for devices designed to comply with Federal Communications Commission (FCC) regulations relating to UWB devices.

Unlike most other wireless systems in which the transmit power limit is typically set with respect to the total power integrated over the entire signal band, UWB devices are allowed to operate within a relatively wide frequency band provided that two criteria are met. First, the occupied bandwidth is required to meet a predefined minimum. Second, the radiated power measured over an integrating bandwidth anywhere within the signal band is required to be less than a predefined maximum. According to the current regulations, UWB devices are allowed to operate in the frequency band between 3.1 to 10.6 GHz. The occupied bandwidth is required to meet a minimum of 500 MHz and the radiated power, when measured over a bandwidth of 1 MHz anywhere within the signal band, is required to be less than −41.3 dBm.

Since in UWB the integrating bandwidth (1 MHz) is much smaller than the bandwidth of the UWB signal itself (500 MHz), the shape of the spectrum is an important issue. In order to maximize the output power of a MB-OFDM transmitter, the spectrum of the generated signal should be made as flat as possible. FIG. 1A is a diagram illustrating a frequency spectrum of an ideal UWB signal. In practice, factors such as D/A converter pulse shape, non-ideal filter characteristics, component variations and data characteristics tend to affect the shape of the spectrum. FIG. 1B is a diagram illustrating the frequency spectrum of a typical UWB signal generated by an existing device. There are peaks and variations in the frequency spectrum. The transmit power is typically limited by the largest peak in the signal spectrum. It would be desirable to have a UWB MB-OFDM transmitter design that would generate a flat output spectrum over the operating frequency range of the transmitter.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Spectrum shaping techniques for transmitting OFDM signals are disclosed. In some embodiments, a band gain control is used to determine a band gain for a selected band associated with the signal to be transmitted. In some embodiments, a sub-carrier amplitude control is used to apply a gain factor to each of the sub-carrier frequency components of the modulated signal. In some embodiments, modified synchronization sequences are used to reduce peaks in the frequency spectrum. In some embodiments, a random phase shifter introduces random or pseudorandom phase shifts to the signal to reduce repetitive patterns in the signal and achieve flatter frequency spectrum. Combinations of these techniques can be used in various embodiments. For purposes of illustration, spectrum shaping of frequency hopping OFDM signals is discussed in detail below.

Figure 1A:
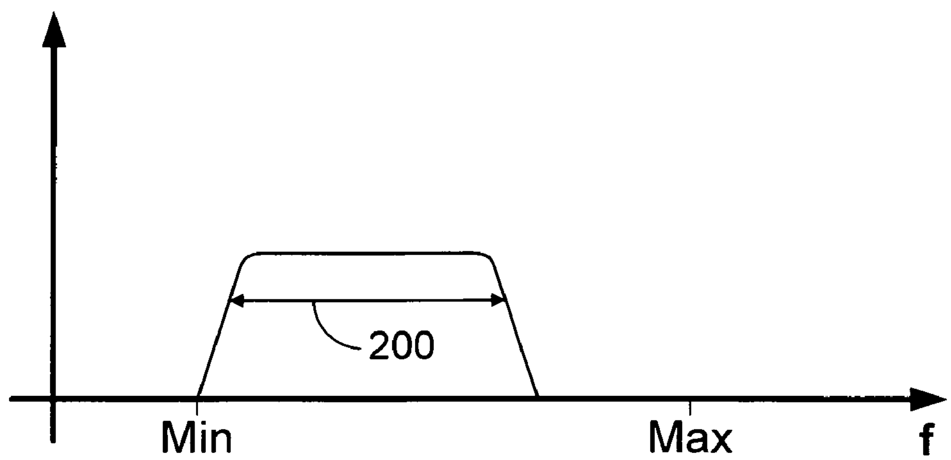
FIG. 1A is a diagram illustrating a frequency spectrum of an ideal UWB signal.
Figure 1B:
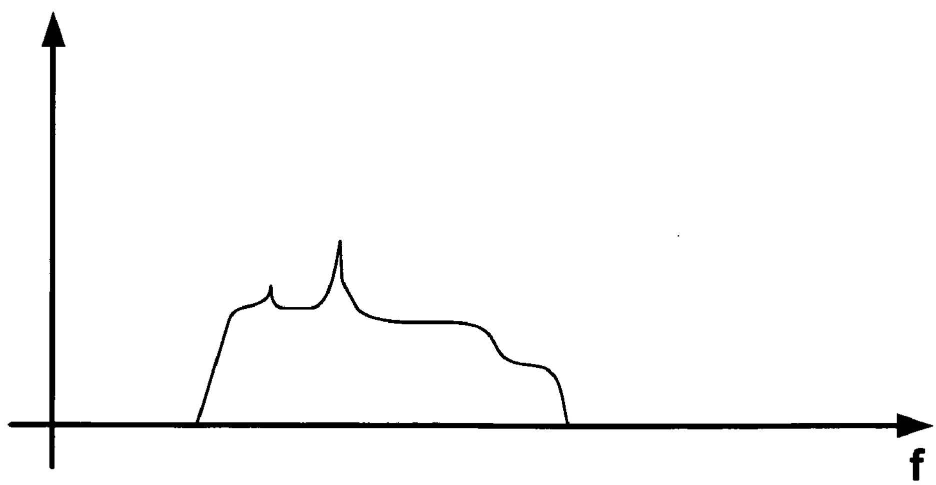
FIG. 1B is a diagram illustrating the frequency spectrum of a typical UWB signal generated by an existing device.
Figure 1C:
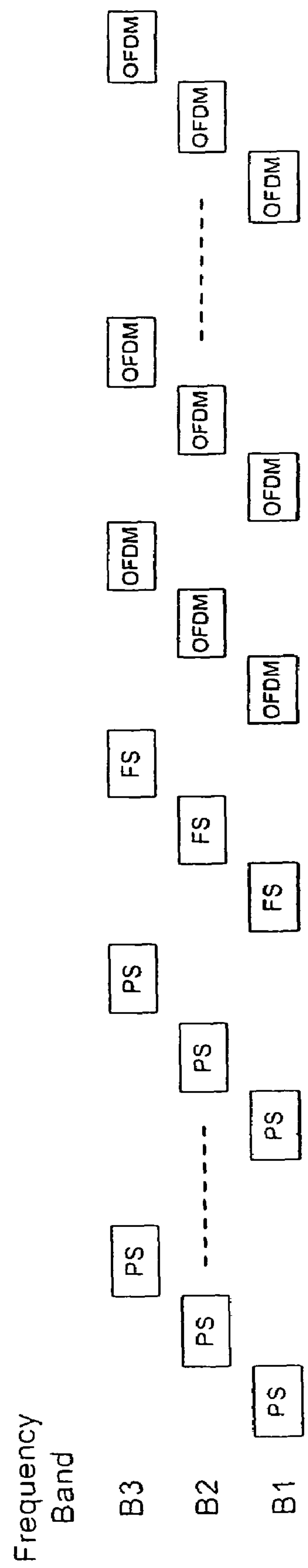
FIG. 1C is a diagram illustrating the transmission of an OFDM packet using multiple frequency hopping bands.

In some MB-OFDM systems, multiple frequency hopping bands (also referred to as hop bands or transmission bands) are used to transmit OFDM symbols to avoid symbol collision. An OFDM symbol waveform includes a number of modulated carrier waveforms, referred to as sub-carriers. Each sub-carrier is used to carry one data symbol, encoded as a phase shift or a combination of amplitude shift and phase shift. In some embodiments, the sub-carrier frequency spacing is approximately equal to the inverse of the OFDM symbol duration, which means that the sub-carrier waveforms partly overlap in the frequency domain. FIG. 1C is a diagram illustrating the transmission of an OFDM packet using multiple frequency hopping bands. In the example shown, each rectangle corresponds to a synchronization symbol or an OFDM symbol. The initial part of the packet, referred to as the synchronization preamble, includes a sequence of identical packet synchronization (PS) symbols, followed by a small number of frame synchronization (FS) symbols. The synchronization symbols are used to aid the receiver in synchronizing to the received signal. In the example shown, the synchronization symbols, include a specific sequence of binary phase shift keying (BPSK) symbols known as the synchronization sequence. The PS and FS symbols are identical except for a phase shift of 180°, making them easily distinguishable to the receiver. Detecting the location of the FS symbols allows the receiver to determine the boundary between the synchronization preamble and the header/data portion of the packet.

Figure 2A:
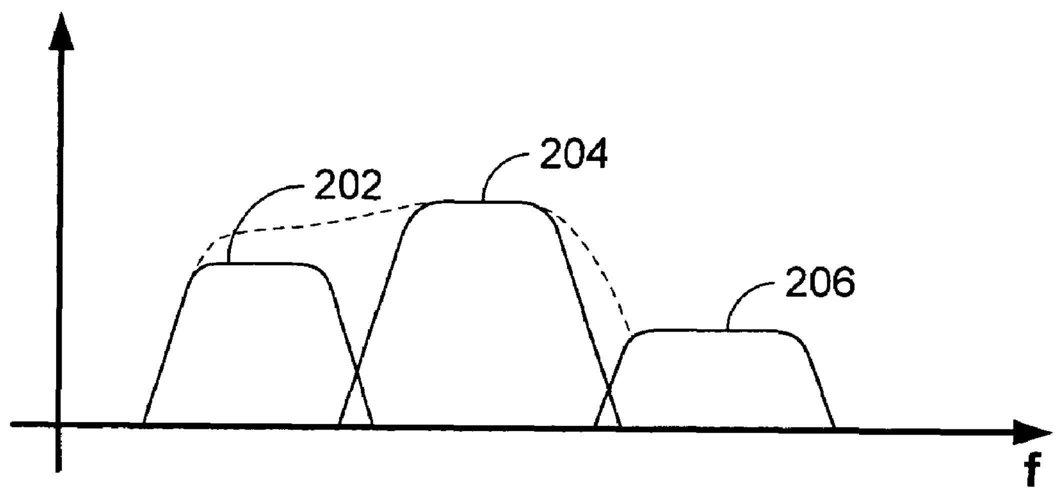
FIG. 2A is a diagram illustrating the frequency spectrum of three hop bands generated by some transmitter embodiments.

For the purpose of illustration, three frequency hopping bands are used in the examples below, although any number of frequency hopping bands may be used as appropriate. FIG. 2A is a diagram illustrating the frequency spectrum of three hop bands generated by some transmitter embodiments. In this example, the frequency spectrum that includes hop bands 202, 204 and 206 is uneven. The unevenness of the frequency spectrum is sometimes due to component gain difference (i.e. the gain difference introduced by transmitter components such as mixers, amplifiers, filters and the antenna). Variations in the manufacturing process and changes in the operating environment are some additional factors that may contribute to the gain difference.

Figure 2B:
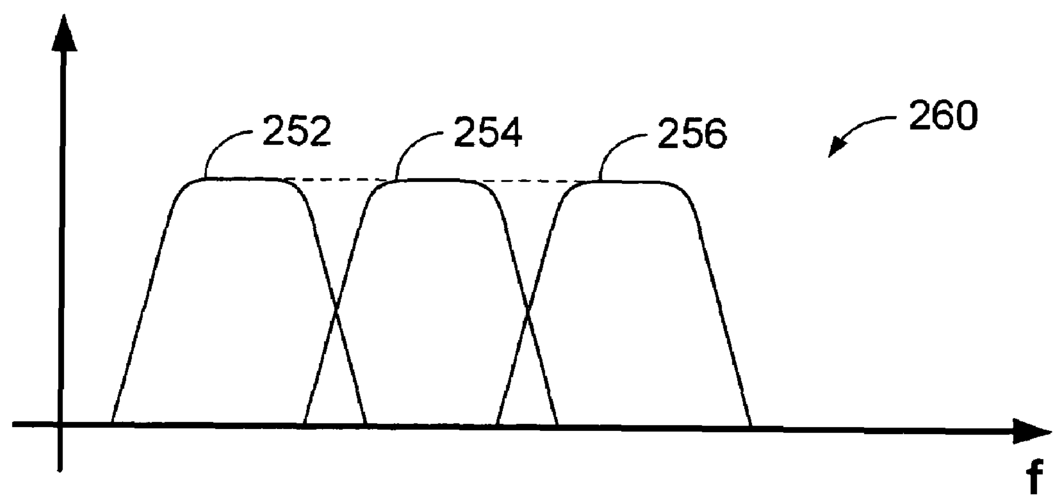
FIG. 2B is a diagram illustrating the frequency spectrum of three hop bands generated by a transmitter embodiment that compensates the effects shown in FIG. 2A.

FIG. 2B is a diagram illustrating the frequency spectrum of three hop bands generated by a transmitter embodiment that compensates the effects shown in FIG. 2A. In this example, frequency hopping bands 252, 254 and 256 each has a corresponding band gain used to compensate and adjust the signal strength to achieve a relatively flat frequency spectrum 260. The adjustment is made by determining the frequency hopping band associated with the signal to be transmitted, determining the band gain that corresponds to the frequency hopping band and applying the band gain to the signal. The band gains are determined during the design process of the transmitter in some embodiments to correct any systematic gain deviations for different hop bands. In some embodiments, an uncompensated output signal is measured to supply feedback information used to determine the band gain values and achieve the desired frequency spectrum characteristics. The feedback technique can be used during the manufacturing process, during the transmission operations of the transmitter or both.

Figure 3:
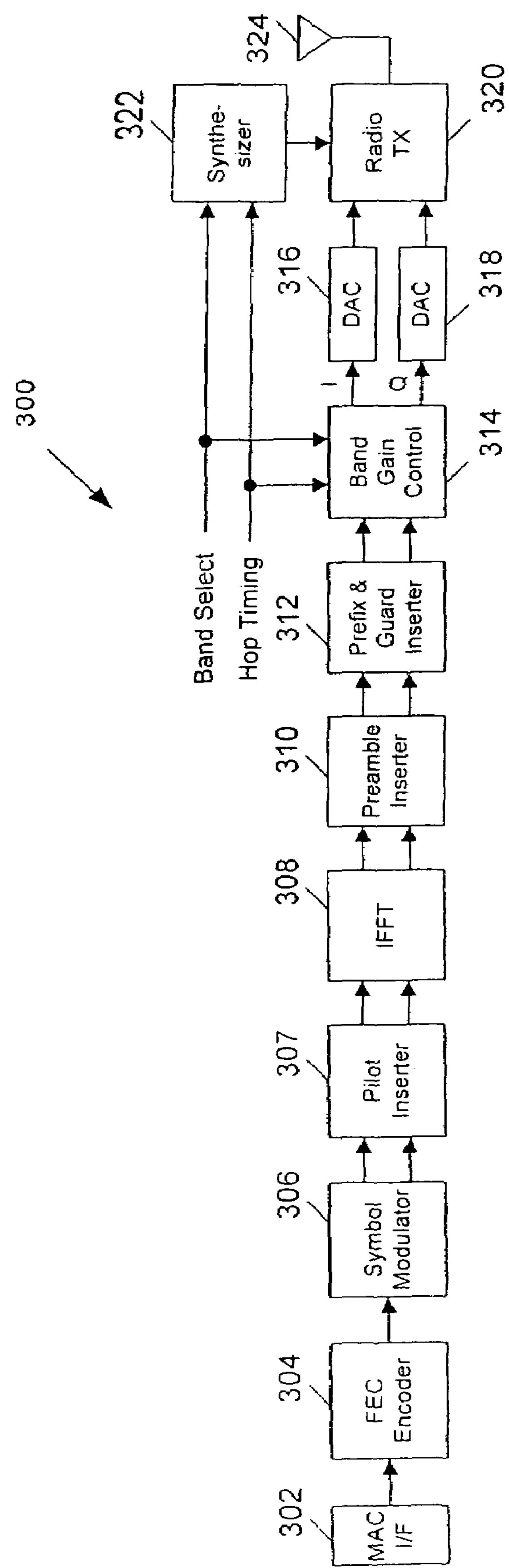
FIG. 3 is a block diagram illustrating an OFDM transmitter embodiment.

FIG. 3 is a block diagram illustrating an OFDM transmitter embodiment. In this example, transmitter 300 outputs a signal with a gain compensated frequency spectrum similar to 260. Data bits are received on medium access control (MAC) interface 302 and then encoded by a forward error correction (FEC) encoder 304. In some embodiments, the encoded bits are optionally punctured, interleaved and repeated to provide better protection against multipath and interference. The bits are then mapped to modulation symbols by a symbol modulator 306. Quadrature Phase Shift Keying (QPSK) or other appropriate modulation scheme may be used. The modulated symbols such as QPSK symbols are also referred to as sub-carriers. Optionally, pilot tone inserter 306 adds pilot tones to the modulated symbols. An inverse Fast Fourier Transform (IFFT) component 308 is used to transform blocks of symbols from frequency domain into a time domain waveform (also referred to as an OFDM symbol). A synchronization preamble that includes repeated PS and FS synchronization symbols is added to the beginning portion of each data packet by preamble inserter 310. Alternatively, the preamble may be inserted before the IFFT (i.e., in the frequency domain). A guard interval and a cyclic prefix or zero prefix are added to the OFDM symbol by prefix and guard inserter 312.

In this example, band gain control 314 applies a time varying band gain factor on its input to counter the effects of gain variations in different hop bands to achieve a more uniform frequency spectrum. Depending on the value of the gain factor that is applied, the signal gets amplified, attenuated or remains unchanged as appropriate. Band gain control 314 is controlled by a hop timing signal and a band select signal. Gain values that correspond to different hop bands are stored in a lookup table or other appropriate storage. The hop timing signal determines when the band gain factor should change according to the timing of the OFDM symbol generation. The band select signal determines the value of the band gain factor used for a given hop band. In some embodiments, signal strength is measured during operation and an appropriate gain is determined according to the measurement.

The inphase (I) and quadrature (Q) components of the gain compensated baseband OFDM signal are converted from digital to analog by digital to analog converters (DACs) 316 and 318, respectively. The analog signals are sent to a radio transmitter 320 to be up-converted to the desired carrier frequency, amplified and then transmitted via antenna 324. The local oscillator (LO) signal used by radio 320 is generated by frequency synthesizer 322, which is also controlled by the control signals. Frequency synthesizer 322 has the ability to switch its output frequency at the start of each OFDM symbol period so that different transmitted OFDM symbols may occupy different hop bands. In some cases, the LO frequency is switched every symbol period. In other cases, the LO frequency remains the same for several symbol periods before it is switched again. It is also possible that the LO frequency is never switched during the transmission of an entire packet. The timing of the frequency switch is controlled by the hop timing signal. The appropriate LO frequency to be synthesized for a given symbol period is determined by the band select signal.

Figure 4A:
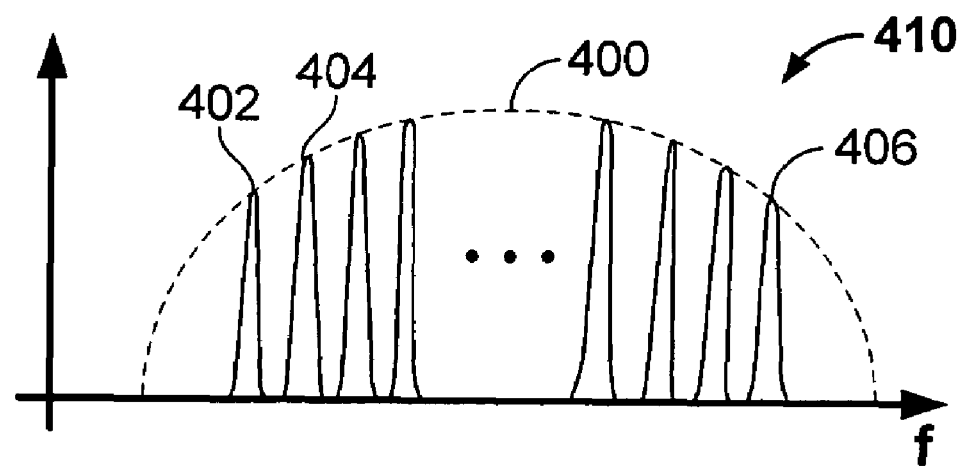
FIG. 4A is a diagram illustrating a frequency spectrum of a set of uncompensated sub-carriers within a frequency hopping band.

Variations in frequency spectrum exist among frequency hopping bands as well as among sub-carriers. FIG. 4A is a diagram illustrating a frequency spectrum of a set of uncompensated sub-carriers within a frequency hopping band. Ideally, the sub-carriers should have equal amplitude and form a flat frequency envelope. In practice, uncompensated sub-carriers such as 402, 404 and 406 have different amplitudes and form a frequency envelope 400 with amplitude variations. In the diagram shown, the signal amplitudes near the edges of the envelope are significantly weaker than those near the center of the envelope. The amplitude variations are partly attributed to the transmitter's DACs, which introduce a sin (x)/x shaping of the signal spectrum and cause the reduction in signal amplitude near the band edges. The various filters in the transmitter's signal path have a similar effect as the DAC. In some embodiments, these filters also cause a ripple in the signal spectrum.

Figure 4B:
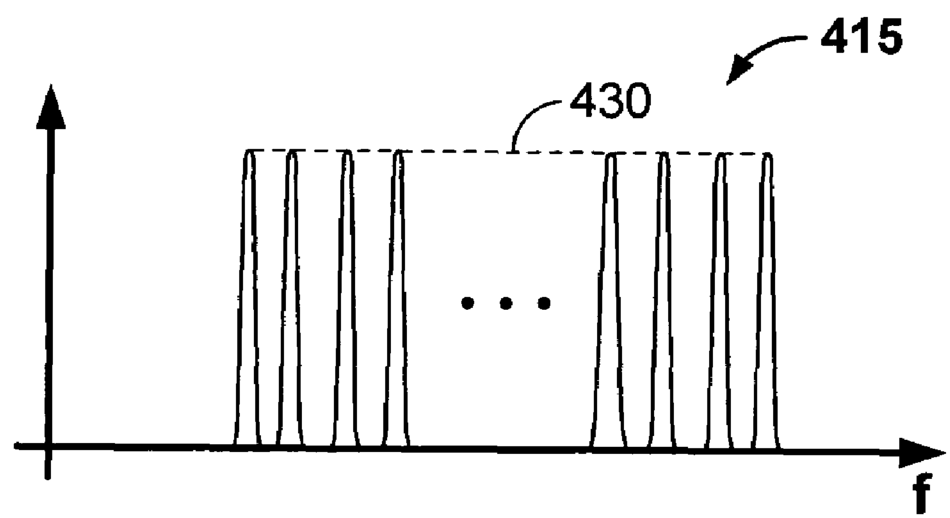
FIG. 4B is a diagram illustrating the frequency spectrum of the sub-carriers after the gain factors are applied.

In some embodiments, the effects of the DACs, the filters as well as other components are offset using gain compensation. A plurality of sub-carrier gain factors are applied to the uncompensated sub-carriers to make the amplitudes of the resulting gain compensated sub-carrier approximately equal. Depending on the value of the gain factor used, the corresponding uncompensated sub-carrier amplitude may be amplified, attenuated or unchanged. FIG. 4B is a diagram illustrating the frequency spectrum of the sub-carriers after the gain factors are applied. Each sub-carrier is multiplied with an appropriate sub-carrier gain factor. The values of the gain factors are selected such that when multiplied with corresponding sub-carriers in signal 415, the resulting compensated sub-carriers have approximately the same amplitude. For example, the sub-carriers near the band edges receive greater gain boost than the sub-carriers near the band center. The resulting sub-carrier envelope 430 is substantially more even compared to 406. In some embodiments, the amplitudes of uncompensated sub-carrier frequency components are measured to supply feedback information used to determine the sub-carrier gain factors. The measurement may take place during the manufacturing process, during the transmission operations of the transmitter or both.

Figure 5:
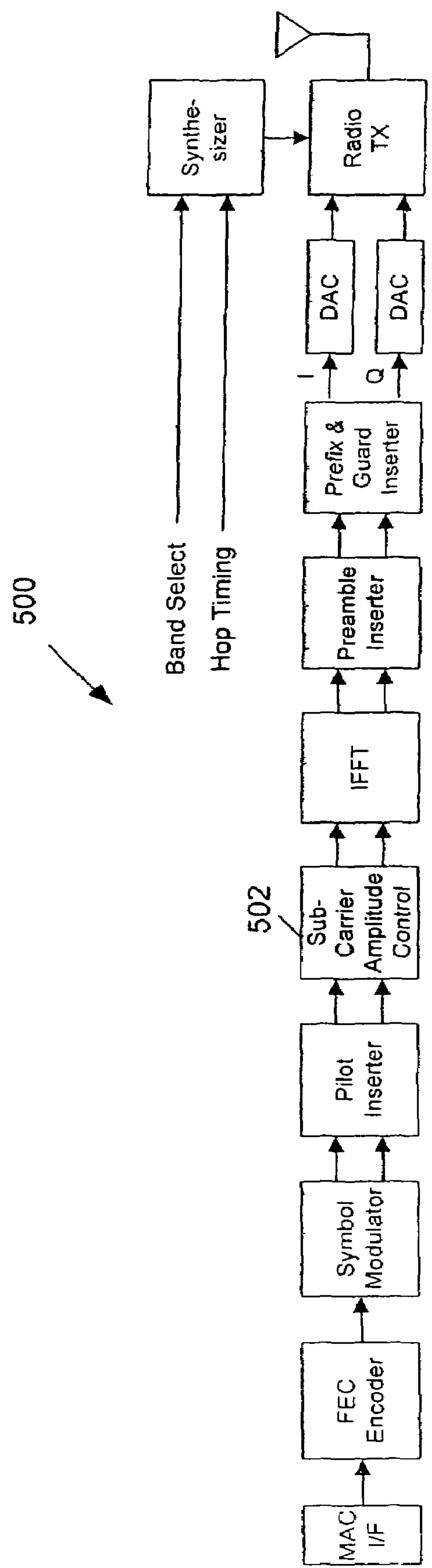
FIG. 5 is a block diagram illustrating an OFDM transmitter embodiment that adjusts the sub-carrier amplitudes.

FIG. 5 is a block diagram illustrating an OFDM transmitter embodiment that adjusts the sub-carrier amplitudes. In this example, like components of transmitter 500 and transmitter 300 perform like functions. Transmitter 500 additionally includes a sub-carrier gain control 502 that adjusts the amplitudes of the sub-carriers by applying appropriate gain factors to the corresponding sub-carriers. In some embodiments, a different set of gain factors is used for each frequency hopping band. Additionally, a different gain factor may be applied to the Inphase and Quadrature components of each sub-carrier. During transmission, the frequency hopping band associated with the signal is determined and the appropriate set of gain factors is selected and applied. The application of the gain factors compensates the spectral distortion introduced by the DACs and various filters in the transmit signal path. A substantially flat baseband signal similar to signal 430 is thus obtained.

Figures 6A, 6B:
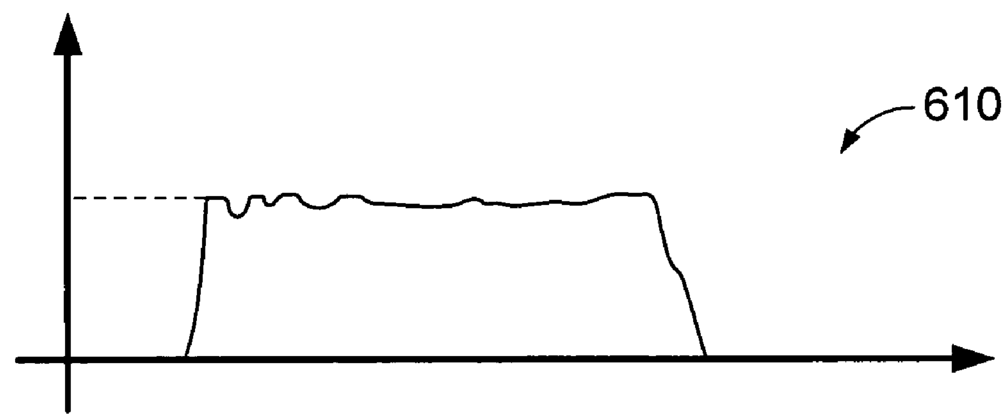
FIG. 6A is a diagram illustrating the frequency spectrum of a signal.
FIG. 6B is a diagram illustrating the clipped frequency spectrum.

The synchronization sequences are often chosen for their autocorrelation and cross correlation properties rather than their spectral properties. As a result, the synchronization data sequence sometimes introduces peaks in the frequency spectrum, making the frequency spectrum substantially non-flat. FIG. 6A is a diagram illustrating the frequency spectrum of a signal. In this example, the signal includes several peaks (such as peak 602) in its frequency spectrum. In some embodiments, the signal is clipped at a level 604 to create a frequency spectrum that is more even. FIG. 6B is a diagram illustrating the clipped frequency spectrum. Details of the clipping process are discussed below.

Figure 7:
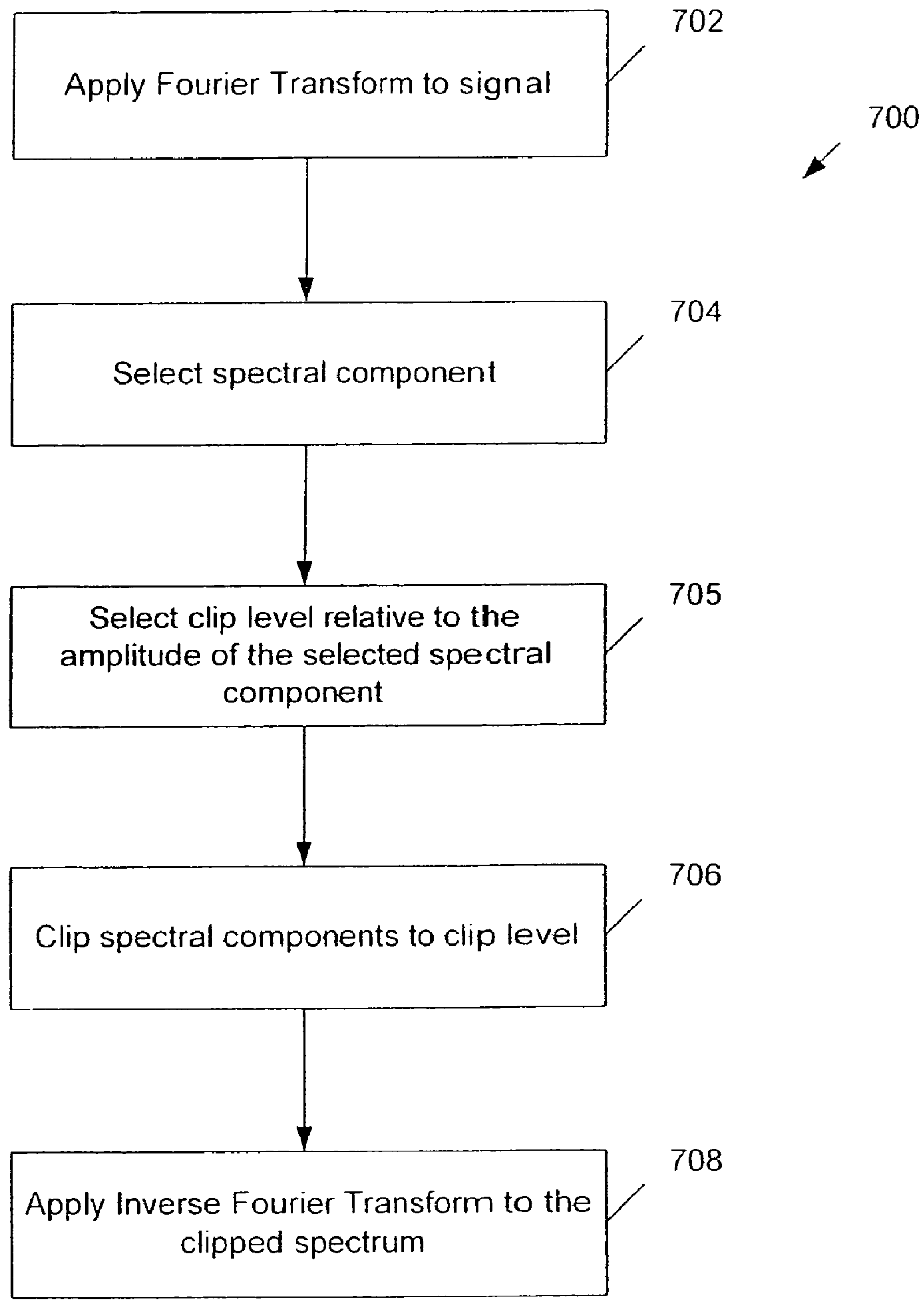
FIG. 7 is a flowchart illustrating a frequency clipping process according to some embodiments.

FIG. 7 is a flowchart illustrating a frequency clipping process according to some embodiments. During process 700, frequency components of an input are limited to a predetermined clip level in order to reduce or eliminate the peaks and achieve a flat frequency spectrum. The original data sequence is first Fourier transformed to obtain its complex-valued spectral representation (702). A spectral component is then selected (704). In this example, the spectral component (also referred to as the Fourier coefficient) with the maximum amplitude is chosen. Next, the clip level is selected (705). The clip level, which controls the flatness of the generated signal spectrum, is chosen relative to the selected spectral amplitude in some embodiments. The amplitudes of the spectral components are then clipped according to the clip level (706). In other words, spectral components with amplitude exceeding the clip level are given a new amplitude value equal to the clip level. Other spectral components with amplitudes less than or equal to the clip level are unchanged. Finally, an inverse Fourier transform is applied to the clipped spectrum to transform the signal back to the time domain (708).

The clipping operation can affect the auto-correlation and cross-correlation properties of the synchronization sequence. In some embodiments, a moderate clip level (for example, 3 dB below the maximum spectral amplitude) is chosen to achieve a substantial improvement of the spectral flatness with only a small impact on the performance of the receiver. In some embodiments, the clip level is further reduced until all the spectral components in the modified synchronization sequence have approximately equal amplitude, thus creating a spectrum that is substantially flat. In some cases, the clip level is set to a value less than or equal to the smallest spectral amplitude. In some embodiments, several outputs generated by using different clip levels are compared to select an appropriate clip level that offers flat spectrum without significantly degrading the output sent to the receiver.

Figure 8:
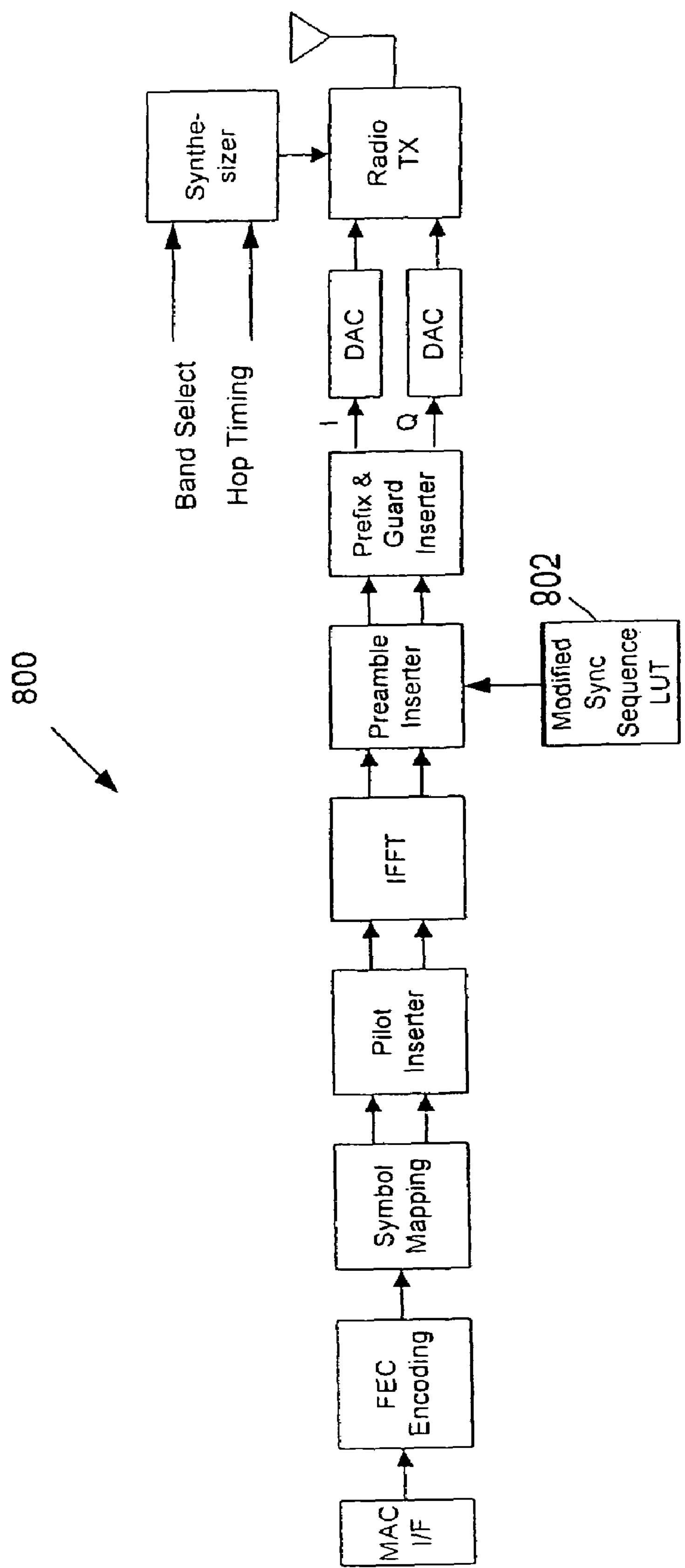
FIG. 8 is a block diagram illustrating another OFDM transmitter embodiment.

It is not necessary to perform the computations described in process 700 for each data sequence during transmission. In some embodiments, similar effects are achieved by using pre-computed, modified synchronization sequences that have reduced spectral peaks in the preamble waveform. One way to derive the modified synchronization sequences is to apply the computations of process 700 to different synchronization sequences and store the results. FIG. 8 is a block diagram illustrating another OFDM transmitter embodiment. Like components of transmitter 800 and transmitter 300 perform like functions. In this example, modified synchronization sequences are stored in a lookup table 802. When a preamble is to be generated, the modified synchronization sequence that corresponds to the preamble is retrieved and inserted into the signal stream. Other implementations are sometimes used in different embodiments. For example, the preambles can be inserted prior to the IFFT operation. The frequency domain components may be clipped and buffered before they are processed by the IFFT component.

In some embodiments, a random phase shifter that applies random or pseudorandom phase shifts to the OFDM symbols is used to randomize the signal and reduce peaks in the frequency spectrum. The amount of phase shift for each symbol may be determined according to a pseudo random sequence or other predefined sequence. If desired, the sequence of phase shifts can be reconstructed in the receiver, allowing the receiver remove the phase shift of each received OFDM symbol before other tasks such as channel estimation, phase estimation and data demodulation are carried out.

Figure 9:
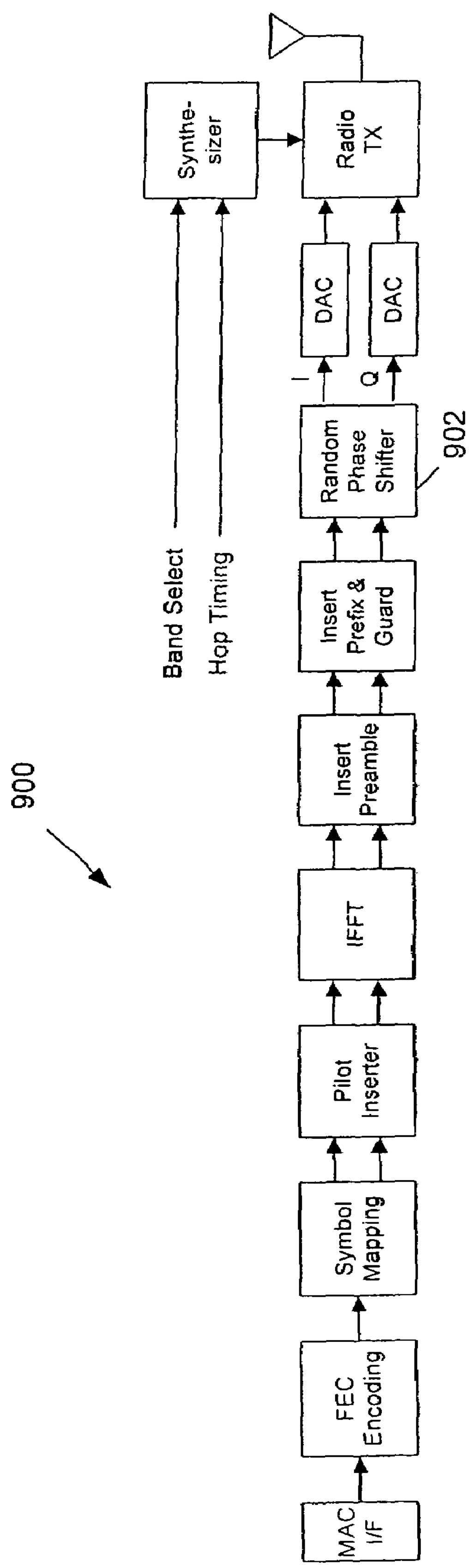
FIG. 9 is a block diagram illustrating another OFDM transmitter embodiment that implements the phase shift.

FIG. 9 is a block diagram illustrating another OFDM transmitter embodiment that implements the phase shift. In this example, a random phase shifter 902 is used to introduce random or pseudo random phase shifts to the OFDM symbols. In some embodiments, the phase shifts are limited to multiples of 90° (i.e. the phase shifts are restricted to 0°, 90°, 180°, 270°) so that the random phase shifter can be implemented via two basic operations: interchanging the I and Q signal components and reversing the sign of I and/or Q signal components. Although the random phase shift is shown to take place prior to analog to digital conversion in this example, the phase shift operation may also be performed elsewhere in the transmitter. For example, the phase of the QPSK symbols at the input of the IFFT may be shifted before the IFFT is applied.

Figure 10:
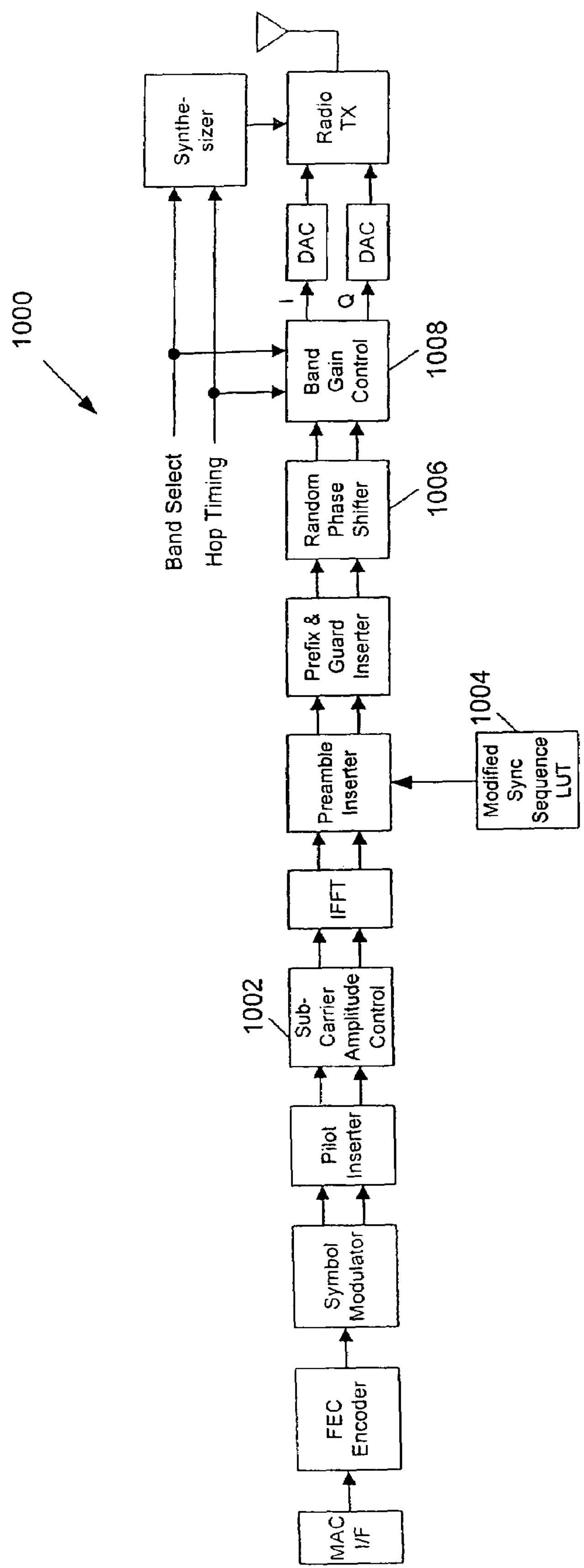
FIG. 10 is a diagram illustrating a transmitter embodiment that includes several spectrum shaping components.

The spectrum shaping techniques can be used in combination in some embodiments. For example, some transmitter embodiments include both a modified synchronization sequence lookup table for clipping preamble frequency spectrum and a random phase shifter for performing phase shift. Some transmitter embodiments use both a band gain control and a sub-carrier amplitude control. FIG. 10 is a diagram illustrating a transmitter embodiment that includes several spectrum shaping components. Transmitter 1000 shown in this example includes a sub-carrier amplitude control 1002, a modified synchronization sequence lookup table 1004, a random phase shifter 1006 and a band gain control 1008. One or more of these components may be active at the same time to shape the output signal to achieve a more uniform output spectrum.

Figure 11:
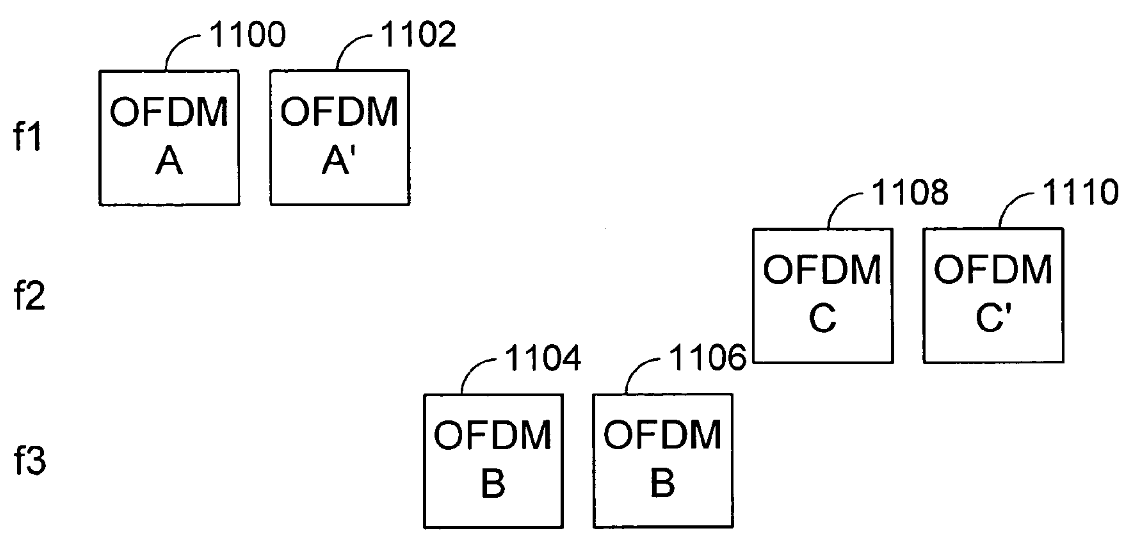
FIG. 11 is a diagram illustrating an embodiment of a frequency hopping transmission that employs time spreading.

FIG. 11 is a diagram illustrating an embodiment of a frequency hopping transmission that employs time spreading. In the example shown, OFDM symbols 1100, 1102, 1104, 1106, 1108, and 1110 are part of a packet. Synchronization symbols for the packet are not illustrated and there may be more OFDM symbols in addition to those illustrated. Using time spreading, two instances of each OFDM symbol are transmitted on the same hop band in this example. Time spreading is a process in which an OFDM symbol is input and multiple instances of the OFDM symbol are output. Instances may be unmodified (an identical copy of the original OFDM symbol) or may be modified. OFDM symbol A 1100 and OFDM symbol A' 1102 are transmitted on the hop band with center frequency f1, where OFDM symbol A' 1102 is a modified instance and OFDM symbol A 1100 is an unmodified instance. OFDM symbol B 1104 and OFDM symbol B 1106 are transmitted on the hop band with center frequency f3 and OFDM symbol C 1108 and OFDM symbol C' 1110 are transmitted on the hop band with center frequency f2.

In some embodiments, all transmitted instances in a packet are unmodified. The two instances may be the output of a duplication block that outputs two identical instances for every OFDM symbol input. For example, OFDM symbols A, A, B, B, C, and C of a packet may be transmitted. In some embodiments, one or both of the transmitted instances in a packet are a modification of the original OFDM symbol. For example, OFDM symbols A, A', B, B', C, and C' of a packet may be transmitted. In another example, OFDM symbols A', A", B', B", C', and C" of a packet may be transmitted, where OFDM symbol A" is another modification of OFDM symbol A that is a different modification compared to OFDM symbol A'. In some embodiments, a combination of methods is employed in the same packet. In some embodiments, the method of generating the two instances of an OFDM symbol is random.

In some embodiments, the frequency hopping scheme varies from that illustrated. For example, there may be more or less than three hop bands. The sequence of hops may vary from that shown. In some embodiments, the hop band changes at a different rate than that illustrated. For example, the hop band may change after every four OFDM symbols transmitted instead of every two OFDM symbols. In some embodiments, frequency band hopping is not employed and all synchronization symbols and OFDM symbols are transmitted on the same band. For example, OFDM symbols A 1100, A' 1102, B 1104, B 1106, C 1108, and C' 1110 may be transmitted on band f1.

In some embodiments, the order of the OFDM symbols varies from that illustrated. In some embodiments, the modified instance is transmitted before the unmodified instance. In some embodiments, the two instances are not transmitted successively.

In some embodiments, the modification of the OFDM symbol is inversion. Some embodiments employ other modification techniques. For example, the modification may be swapping the I and Q signals or the modification may be the complex conjugation of the OFDM symbol. Another example modification is phase shifting. A combination of methods may also be employed.

If for some OFDM symbols both instances are transmitted on the same band and the instances are different, the transmitted spectral shape may be flatter than if the instances are the same. Rather than having the two instances of an OFDM symbol repeat each other on the same band (and thus repeat the same spectrum), two different instances may have different spectrums and contribute to a flatter spectrum overall. For example, a process may be applied to select a subset of OFDM symbols in a packet. For the OFDM symbols not selected, the instances of each unselected OFDM symbol are the same. In some embodiments, the instances are both unmodified instances. For the subset of selected OFDM symbols, two different instances of each selected OFDM symbol are transmitted. In some embodiments, one instance is an unmodified instance and the other is a modified instance of the original OFDM symbol. When the spectrum is measured (perhaps over multiple OFDM symbols or multiple packets) a flatter spectral shape is produced.

Figure 12:
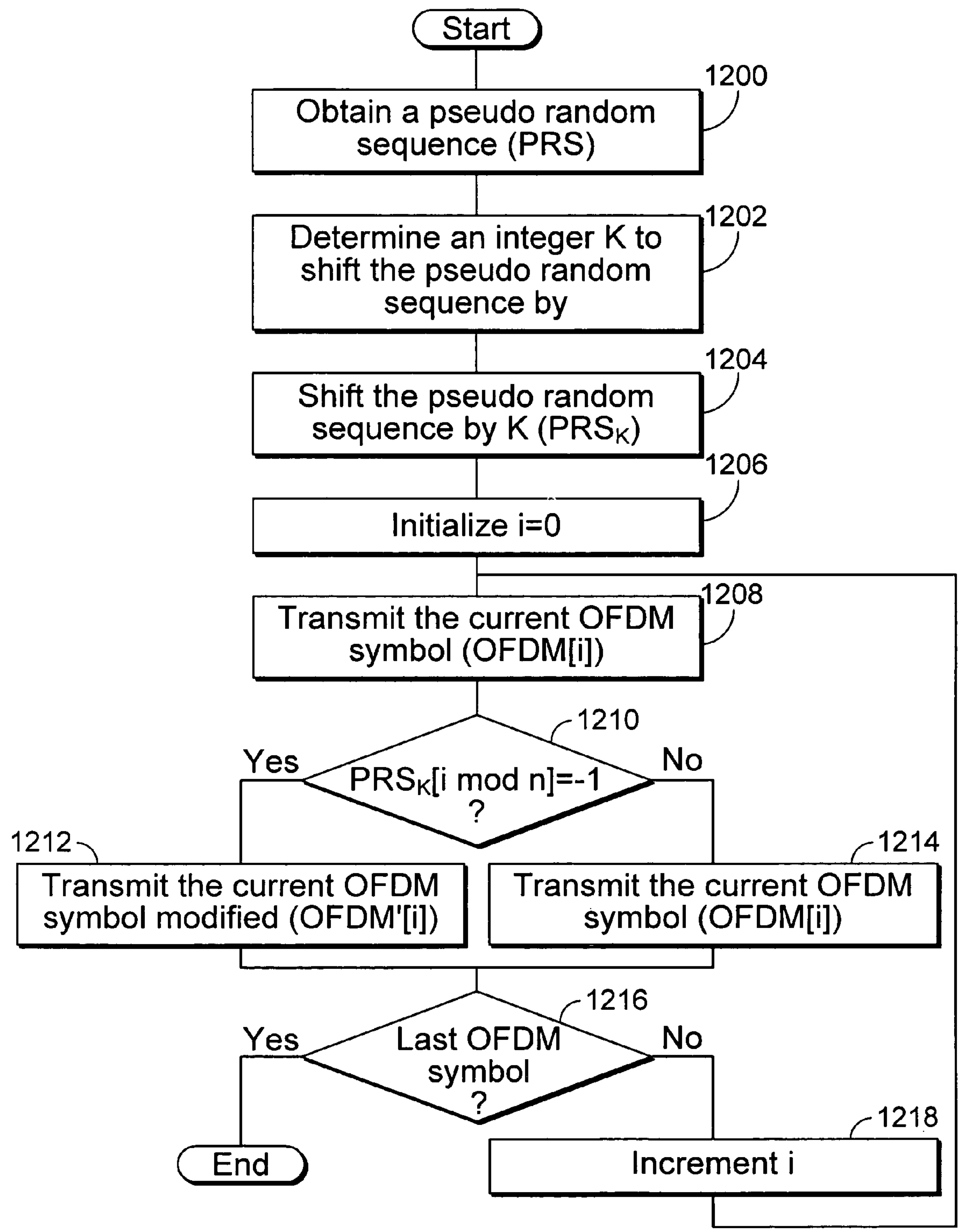
FIG. 12 is a flowchart illustrating an embodiment of a process for transmitting a subset of OFDM symbols with different instances.

FIG. 12 is a flowchart illustrating an embodiment of a process for transmitting a subset of OFDM symbols with different instances. In the example shown, either a modified instance or an unmodified instance is transmitted after an unmodified instance of the OFDM symbol. A pseudo random sequence (PRS) is obtained at 1200. For example, the pseudo random sequence may be the sequence of pilot tones inserted into each OFDM symbol. A pseudo random generator may also be used. In this example, the elements of the pseudo random sequence are either 1 or −1. An example of such a pseudo random sequence is [1 −1 −1 1 −1] where each of the elements are generated using a random process. In some embodiments, a pseudo random number generator already included in the design is used to generate the random number multiple times. Logic is reused and die size and manufacturing costs are kept low.

In some embodiments, the elements in the random sequence take on different values than those illustrated. The elements may take on more than two values. In some embodiments, the values of the elements are discrete values such as integer values. In some embodiments, the elements are continuous values.

The pseudo random sequence is shifted by K ($PRS_K$) at 1204. For example, if PRS=[1 −1 −1 1 −1] and K=2, then $PRS_K$=[−1 1 −1 1 −1]. At 1206 *i* is initialized to 0; i is used to track the current OFDM symbol and the current index of the shifted pseudo random sequence. The current OFDM symbol (OFDM[i]) is transmitted at 1208.

At 1210 it is determined whether $PRS_K[i \bmod n]=-1$ where n is the length of the pseudo random sequence. If the shifted pseudo random sequence is equal to −1 then the current OFDM symbol is modified before it is transmitted at 1212. Control is then transferred to step 1216. If the shifted pseudo random sequence is not equal to −1, then the current OFDM symbol (OFDM[i]) is not modified before it is transmitted at 1214. Control is then transferred to step 1216.

At 1216, it is determined whether the current OFDM symbol is the last OFDM symbol of the packet. If the current OFDM symbol is the last one then the process ends. Otherwise, control is transferred to 1218 and i is incremented. Control is then transferred back to 1208 and the next OFDM symbol (OFDM[i]) is transmitted.

Figure 13:
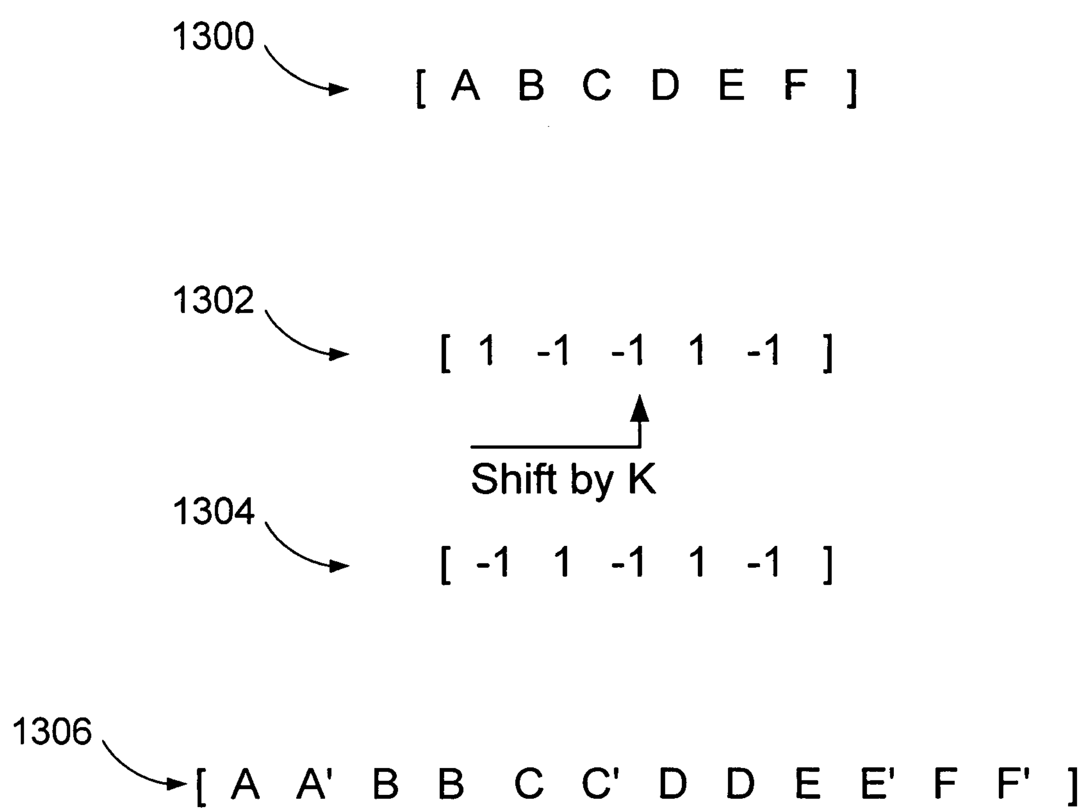
FIG. 13 illustrates an embodiment of a shifted pseudo random sequence used to select instances of OFDM symbols to modify.

FIG. 13 illustrates an embodiment of a shifted pseudo random sequence used to select instances of OFDM symbols to modify. In the example shown, pseudo random sequence 1302 is shifted by K=2 to created shifted pseudo random sequence 1304. Shifted pseudo random sequence 1304 is used to determine which input components of input signal 1300 to modify. The input signal may represent a packet and the input components are the OFDM symbols of the packet. Output signal 1304 represents the sequence of time spread instances transmitted.

Shifted pseudo random sequence 1304 is used to determine whether output signal 1306 includes a modified instance or an unmodified instance for the second instance of each OFDM symbol. The first input element in input signal 1300, OFDM symbol A, is copied to output signal 1306. Since the first element in shifted pseudo random sequence 1304 is −1, a modified instance (A') is copied to output signal 1306. Otherwise an unmodified instance is copied. This process repeats for the rest of the input elements. If there are more OFDM symbols in input signal 1300 than elements in shifted pseudo random sequence 1304 the index wraps to the beginning of the shifted pseudo random sequence 1304. Thus, both OFDM symbol A and OFDM symbol F use the first element in shifted pseudo random sequence 1304, which is −1.

Figure 14A:
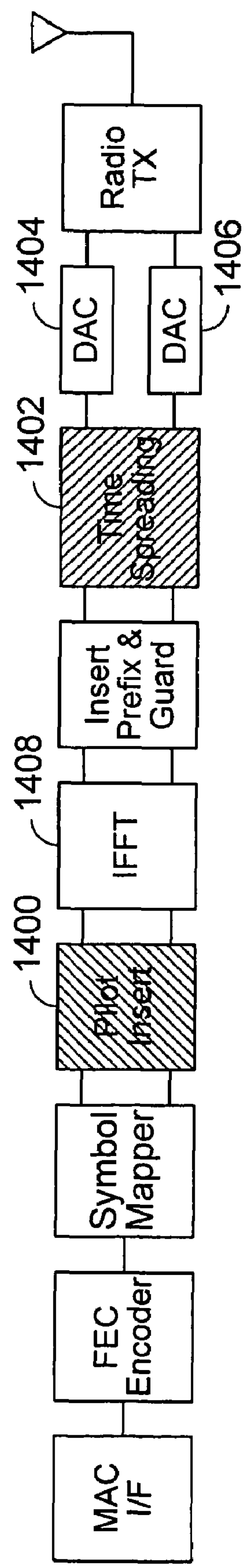
FIG. 14A illustrates an embodiment of a transmitter which implements spectral shaping using time spreading in the time domain.

FIG. 14A illustrates an embodiment of a transmitter which implements spectral shaping using time spreading in the time domain. In the example shown, corresponding modules perform the same functions as those described in FIG. 3. Pilot insertion block 1400 and time spreading block 1402 perform spectral shaping using time spreading. Time spreading block 1402 is after IFFT 1408 and processes time domain signals. For every OFDM symbol that is passed to time spreading block 1402, two instances are output to DACs 1404 and 1406. The first instance output by time spreading block 1402 may be an unmodified copy of the input OFDM symbol. The second instance is either a modified instance or an unmodified instance of the input OFDM symbol. The pilot sequence from pilot insertion block 1400 is used as a pseudo random sequence and it (or a shifted version of it) is used to determine which OFDM symbols to modify. Time spreading block 1402 decides which OFDM symbols to modify using the pilot sequence and performs the appropriate modification or duplication.

Figure 14B:
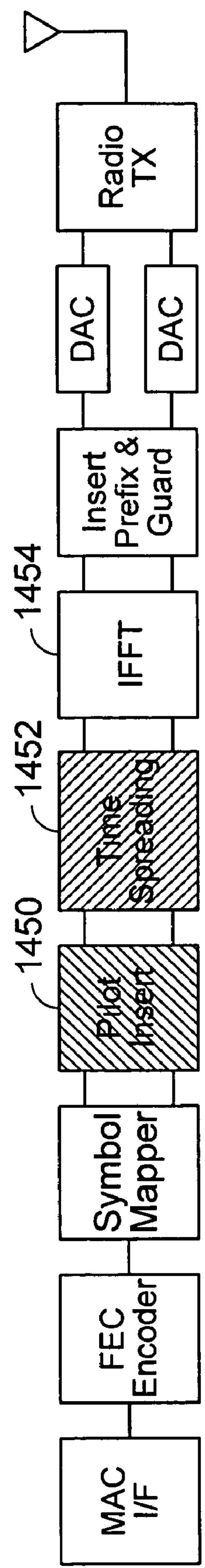
FIG. 14B illustrates an embodiment of a transmitter which implements spectral shaping using time spreading in the frequency domain.

FIG. 14B illustrates an embodiment of a transmitter which implements spectral shaping using time spreading in the frequency domain. In the example illustrated, corresponding modules perform the same functions as those described in FIG. 3. Time spreading block 1452 is before IFFT 1454 and processes frequency domain signals rather than time domain signals. Time spreading block 1452 outputs two instances of an OFDM symbol for every OFDM symbol passed to it. The first instance is an unmodified instance and the second is either a modified instance or an unmodified instance. In this example, time spreading block 1452 is coupled to pilot insertion block 1450. The pilot sequence from pilot insertion block 1450 may be shifted and used to decide which OFDM symbols to modify. Time spreading block 1452 performs this decision making and the appropriate copying/modifying of OFDM symbols passed to it.

The illustrated placement of time spreading block 1402 in the transmitter may consume less power compared to time spreading block 1452. Since time spreading block 1452 is before IFFT 1454, IFFT 1454 must process both instances of each OFDM symbol generated. IFFT 1408, which precedes time spreading block 1402, does not process both instances. This results in less power consumed by the transmitter to run IFFT 1408 using time spreading block 1402.

In some embodiments, time spreading is performed at other points within the transmitter than those illustrated. Design complexity, die size, and power consumption may be considered when deciding where in the transmitter block diagram to perform time spreading. In some embodiments, it may be simpler to combine spectral shaping using time spreading with other modules. In some embodiments, the time spreading block is implemented as multiple modules. For example, a first module may duplicate each OFDM symbol passed to it. A subsequent block may decide which duplicate OFDM symbols to modify and performs the modification.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of shaping an orthogonal frequency division multiplexing (OFDM) signal spectrum of a transmitted signal, comprising:

receiving an input signal that includes a plurality of input components;

generating, for one of the plurality of input components, a first instance;

obtaining a random sequence having a plurality of elements;

shifting the plurality of elements in the random sequence to obtain a shifted sequence;

determining, for said one of the plurality of input components, whether a second instance of said one of the plurality of input components is to be different than the first instance based at least in part on a corresponding one of the elements in the shifted random sequence;

in the event it is determined to generate the second instance that is different from the first instance, generating the second instance of said one of the plurality of input components that is different from the first instance by time spreading;

in the event it is determined to generate the second instance that is not different from the first instance, generating the second instance of said one of the plurality of input components that is the same as the first instance by time spreading; and generating an output signal to be transmitted by a transmitter, wherein the output signal includes the first instance and the second instance, such that the shape of the output signal's orthogonal frequency division multiplexing (OFDM) signal spectrum is different than that of the input signal's.

2. A method as recited in claim 1, wherein said one of the plurality of input components is an OFDM symbol.

3. A method as recited in claim 1, wherein the first instance and the second instance are transmitted on a same transmission band.

4. A method as recited in claim 1 further comprising transmitting the output signal using frequency band hopping.

5. A method as recited in claim 1, wherein generating the second instance of the input component that is different from the first instance includes inversion.

6. A method as recited in claim 1, wherein generating the second instance of the input component that is different from the first instance includes swapping I and Q elements.

7. A method as recited in claim 1, wherein generating the second instance of the input component that is different from the first instance includes complex conjugation.

8. A method as recited in claim 1, wherein generating the second instance of the input component that is different from the first instance includes phase shifting.

9. A method as recited in claim 1, wherein generating the second instance of the input component that is different from the first instance includes using a time domain representation.

10. A method as recited in claim 1, wherein:

in the event there are more input components than elements in the shifted pseudo random sequence, the shifted pseudo random sequence is reused.

11. A method as recited in claim 1, wherein:

the random sequence includes a sequence used in the generation of pilots.

12. A system for shaping an orthogonal frequency division multiplexing (OFDM) signal spectrum of a transmitted signal, comprising:

an interface configured to receive an input signal that includes a plurality of input components; and a signal processor configured to:

generate, for one of the plurality of input components, a first instance;

obtain a random sequence having a plurality of elements;

shift the plurality of elements in the random sequence to obtain a shifted sequence;

determine, for said one of the plurality of input components, whether a second instance of said one of the plurality of input components is to be different than the first instance based at least in part on a corresponding one of the elements in the shifted random sequence;

in the event it is determined to generate the second instance that is different from the first instance, generate the second instance of said one of the plurality of input components that is different from the first instance by time spreading;

in the event it is determined to generate the second instance that is not different from the first instance, generate the second instance of said one of the plurality of input components that is the same as the first instance by time spreading; and generate an output signal to be transmitted by a transmitter, wherein the output signal includes the first instance and the second instance, such that the shape of the output signal's orthogonal frequency division multiplexing (OFDM) signal spectrum is different than that of the input signal's.

13. A system as recited in claim 12, wherein the first instance and the second instance are transmitted on a same transmission band.

14. A system as recited in claim 12, wherein generating the second instance of the input component includes inversion.

15. A computer program product for shaping an orthogonal frequency division multiplexing (OFDM) signal spectrum of a transmitted signal, the computer program product being embodied in a computer readable storage medium and comprising computer instructions for:

receiving an input signal that includes a plurality of input components;

generating, for one of the plurality of input components, a first instance of;

obtaining a random sequence having a plurality of elements;

shifting the plurality of elements in the random sequence to obtain a shifted sequence;

determining, for said one of the plurality of input components, whether a second instance of said one of the plurality of input components is to be different than the first instance based at least in part on a corresponding one of the elements in the shifted random sequence;

in the event it is determined to generate the second instance that is different from the first instance, generating the second instance of said one of the plurality of input components that is different from the first instance by time spreading;

in the event it is determined to generate the second instance that is not different from the first instance, generating the second instance of said one of the plurality of input components that is the same as the first instance by time spreading; and generating an output signal to be transmitted by a transmitter, wherein the output signal includes the first instance and the second instance, such that the shape of the output signal's orthogonal frequency division multiplexing (OFDM) signal spectrum is different than that of the input signal's.

16. A computer program product as recited in claim 15, wherein the first instance and the second instance are transmitted on a same transmission band.

17. A computer program product as recited in claim 15, wherein generating the second instance of the input component includes inversion.

* * * * *

UNITED STATES PATENT AND TRADEMARK OFFICE

CERTIFICATE OF CORRECTION

PATENT NO. : 7,519,123 B1
APPLICATION NO. : 11/099224
DATED : April 14, 2009
INVENTOR(S) : Larsson et al.

It is certified that error appears in the above-identified patent and that said Letters Patent is hereby corrected as shown below:

Claim 15
column 12, line 30; delete “a first instance of;” and insert --a first instance;--

Signed and Sealed this

Second Day of June, 2009

JOHN DOLL
*Acting Director of the United States Patent and Trademark Office*